(12) United States Patent
Champonnois et al.

(10) Patent No.: US 8,905,743 B2
(45) Date of Patent: Dec. 9, 2014

(54) HOOD FOR SUCKING-UP FINE PARTICLES, AND A DEVICE INTENDED FOR THE LASER ABLATION OF A SURFACE LAYER OF A WALL AND INCLUDING SUCH A HOOD

(75) Inventors: François Champonnois, Bures sur Yvette (FR); Yves Lecoffre, La Tronche (FR)

(73) Assignee: Commissariat à l'Energie Atomique et aux Energies Alternatives (FR)

( * ) Notice: Subject to any disclaimer, the term of this patent is extended or adjusted under 35 U.S.C. 154(b) by 502 days.

(21) Appl. No.: 13/141,767

(22) PCT Filed: Dec. 21, 2009

(86) PCT No.: PCT/EP2009/067655
§ 371 (c)(1),
(2), (4) Date: Dec. 13, 2011

(87) PCT Pub. No.: WO2010/072720
PCT Pub. Date: Jul. 1, 2010

(65) Prior Publication Data
US 2012/0076881 A1 Mar. 29, 2012

(30) Foreign Application Priority Data
Dec. 23, 2008 (FR) .................................... 08 59052

(51) Int. Cl.
*B29C 35/08* (2006.01)
*B08B 17/06* (2006.01)
*B23K 26/14* (2014.01)
*B08B 15/04* (2006.01)
*B08B 7/00* (2006.01)
*B23K 26/36* (2014.01)

(52) U.S. Cl.
CPC ............... *B08B 7/0042* (2013.01); *B08B 17/06* (2013.01); *B23K 2201/34* (2013.01); *B23K 26/1405* (2013.01); *B08B 15/04* (2013.01); *B23K 26/367* (2013.01); *B23K 26/1476* (2013.01)
USPC ......................... 425/174; 425/174.4; 55/385.1

(58) Field of Classification Search
USPC ............................... 425/174, 174.4; 55/385.1
See application file for complete search history.

(56) References Cited

U.S. PATENT DOCUMENTS 4,277,131 A * 7/1981 Hart et al. ...................... 359/509
6,576,871 B1 * 6/2003 Jendick ..................... 219/121.84

(Continued)

FOREIGN PATENT DOCUMENTS

EP 0823292 A1 2/1998
FR 2887161 A1 12/2006

OTHER PUBLICATIONS

International Search Report for Application No. PCT/EP2009/067655 dated May 31, 2010.

*Primary Examiner* — James Sanders
(74) *Attorney, Agent, or Firm* — Lerner, David, Littenberg, Krumholz & Mentlik, LLP

(57) ABSTRACT

The invention relates to a hood for sucking-up fine particles, including: a mouth intended to be placed close to a wall, a base having a window through which a laser beam can pass, an intermediate portion between the mouth and the base, and a suction outlet disposed on the intermediate portion of the hood and designed to suck-up fine particles. The hood is characterized in that it comprises at least one air intake positioned near the base and, during operation, capable of creating a stream of air at the base of the hood so as to prevent fine particles from being deposited on the window.

7 Claims, 3 Drawing Sheets

(56) References Cited

U.S. PATENT DOCUMENTS

| | | | |
|---|---|---|---|
| 2002/0134770 A1* | 9/2002 | Freiwald et al. | 219/121.68 |
| 2003/0132210 A1* | 7/2003 | Fujii et al. | 219/121.84 |
| 2003/0142403 A1* | 7/2003 | Kalley et al. | 359/509 |
| 2003/0197909 A1 | 10/2003 | Beyer et al. | |
| 2008/0041832 A1* | 2/2008 | Sykes et al. | 219/121.84 |

* cited by examiner

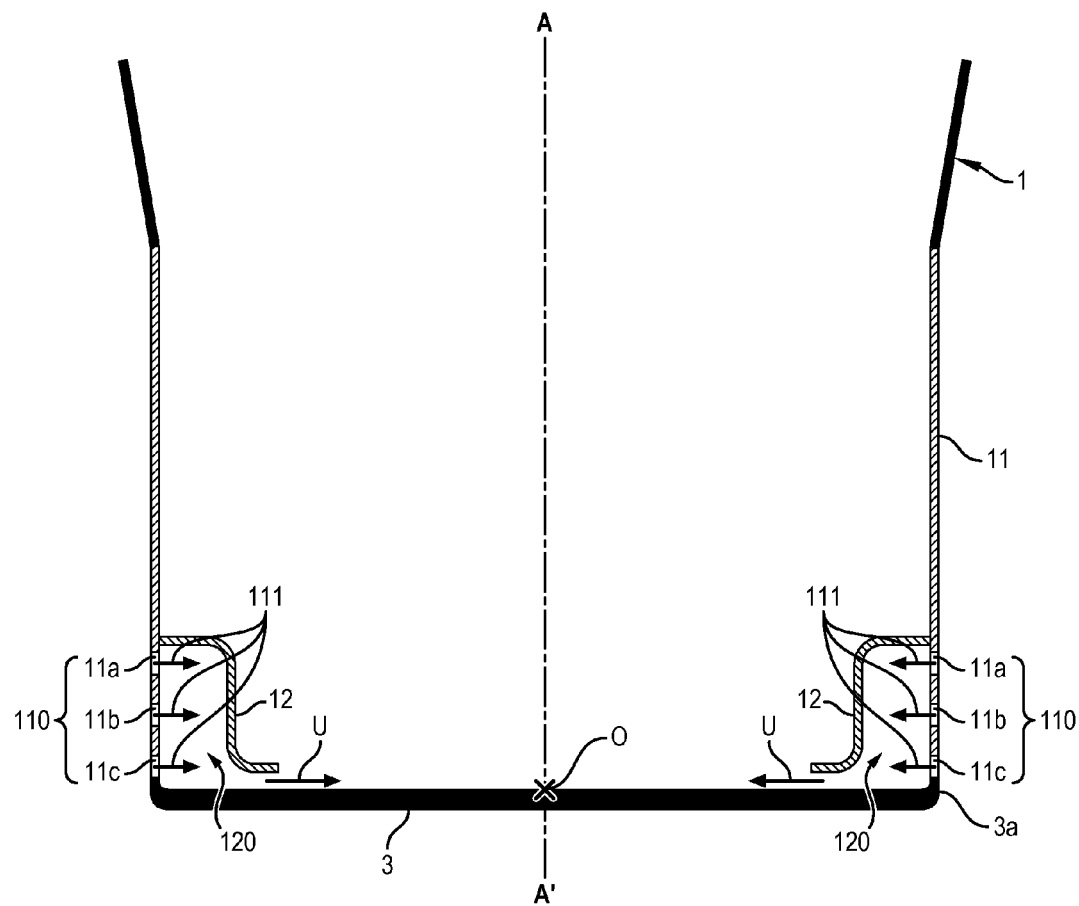
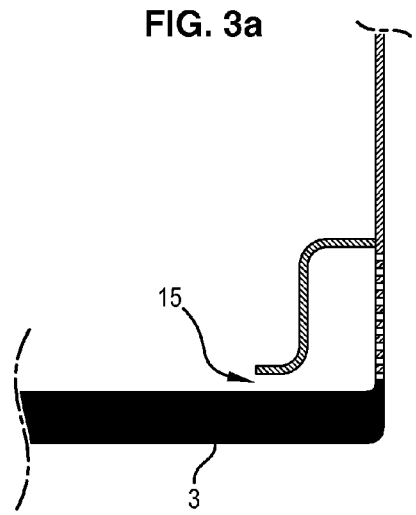
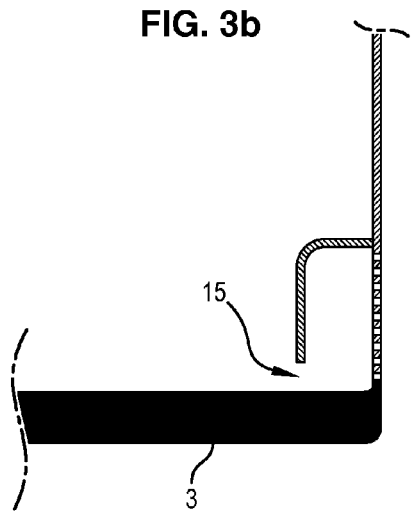

HOOD FOR SUCKING-UP FINE PARTICLES, AND A DEVICE INTENDED FOR THE LASER ABLATION OF A SURFACE LAYER OF A WALL AND INCLUDING SUCH A HOOD

CROSS REFERENCE TO RELATED APPLICATIONS

The present application is a national phase entry under 35 USC §371 of International Application No. PCT/EP2009/067655, filed Dec. 21, 2009, which claims the benefit of and priority to French Patent Application No. 0859052, filed Dec. 23, 2008, the entire disclosures of which are incorporated herein by reference.

GENERAL TECHNICAL FIELD

The invention relates to a hood for sucking away fine particles, particularly used in a device for laser ablation of a superficial layer from a wall, such as a coat of wall paint, in a nuclear installation for example.

STATE OF THE ART

The decontamination and sanitizing of nuclear installations becoming obsolete or having reached their age limit have become a priority for the nuclear industry. An effort is made to clean the contaminated parts of these installations while avoiding producing waste that is also contaminated and attempting to minimize cleaning effluent.

One known solution for carrying out the decontamination of nuclear installations consists of using laser ablation.

Document FR 2 887 161 describes a laser ablation device for ablating a layer of wall paint to be decontaminated, for example in a nuclear installation. Such a device is shown in FIG. 1.

Such a device includes a frame 10 on which is mounted at least one laser source 4b, an optical deflector 4 mounted downstream of the laser source 4b for receiving the laser beams 6. The optical deflector 4 includes at its output a deflection head 4a including a focusing lens 4c for focusing the laser beams 6 onto a layer 2 to be ablated.

Laser ablation consists of withdrawing a layer of small thickness of the contaminant material to be removed, via the interaction of the focused pulsed laser beams emitted by the laser source 4b with said material. Upon laser impact, the material is dislodged and particles of highly variable dimensions are created, the fines having a characteristic dimension much less than one micron. Much larger particles are also created, reaching a few hundred microns in size.

The particles being contaminated, in order to avoid them escaping into the atmosphere a hood 1 is provided which includes:
- an opening 3b that is applied in proximity to the wall 2;
- a base 3a facing the opening 3b;
- a convergent intermediate part between the opening 3b and the base 3a; and
- a suction outlet 5 set on the intermediate part 5a of the hood 1 for sucking away the particles.

The hood 1 is applied in proximity to the wall 2 as illustrated in FIG. 1 and draws in outside atmospheric air 8. Said air 8, after having entered the hood, becomes loaded with particles produced by the laser and said particle-laden air is withdrawn through the suction outlet 5a.

Further, in order to prevent the particles from being deposited on the optical deflector or the focusing lens, a window 3 is provided which is arranged on the base 3a and is attached by means of screws 7 for example. Such a window 3 is surface-treated so as to allow a laser beam 6 to pass with the smallest possible losses.

One problem, however, is that particles can be deposited on the window and prevent proper transmission of the laser beam needed for ablation.

Said particles can, in addition, on contact with the laser beam, degrade the surface treatment of the window.

PRESENTATION OF THE INVENTION

The invention makes it possible to avoid particles being deposited on the window.

Thus, according to a first aspect, the invention relates to a suction hood for fine particles including: an opening designed to be set near a wall; a base including a window capable of allowing passage of a laser beam; an intermediate part between the opening and the base; a suction outlet arranged on the upper part of the hood intended for sucking away the fine particles.

The hood of the invention is characterized in that it includes at least one air inlet arranged at the base, able to create, when operating, a current of air at the base of the hood preventing the deposit of fine particles on the window.

The hood of the invention can also have, optionally, at least one of the following features:
- it includes a convergent nozzle, at the air inlet, designed to cause the air to enter the hood tangentially to the window, then cause it to flow in the hood from the window toward the opening in a direction perpendicular to the window;
- the convergent nozzle includes a wall with an S-shaped section;
- it includes several air inlets arranged on a perimeter of the base of the hood;
- it includes a movable flap designed to at least partially block certain air inlets;
- the air inlets are longitudinal and/or circular openings;
- the intermediate part between the opening and the base is convergent.

And according to a second aspect, the invention relates to a device for laser ablation of a superficial layer of a wall, including a suction hood for sucking away fine particles according to the first aspect of the invention.

PRESENTATION OF FIGURES

Other features and advantages of the invention will also emerge from the following description, which is purely illustrative and non-limiting, and must be read with reference to the appended figures in which, besides FIG. 1 which was already discussed:

FIG. 2 illustrates a detailed view of the base of the hood according to the invention;

FIGS. 3a and 3b illustrate two possible implementations of a convergent nozzle in the hood according to the invention;

DETAILED DESCRIPTION

Figure 1:
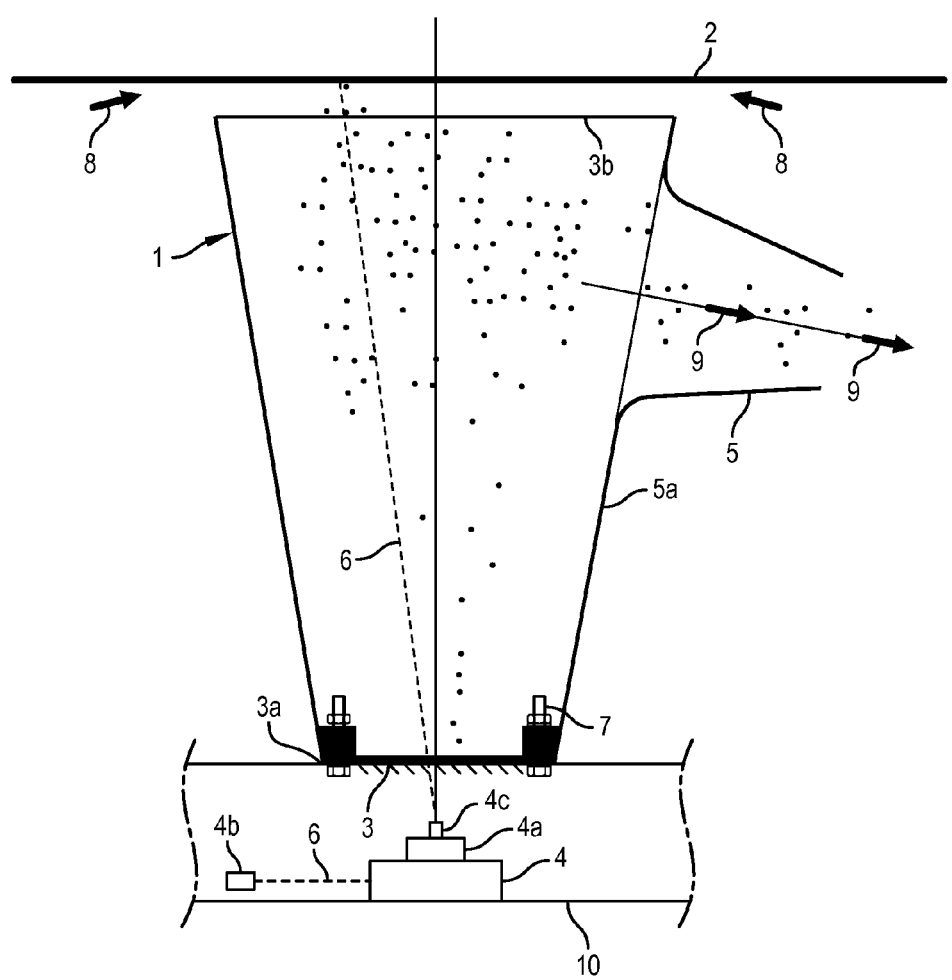

A hood for sucking away fine particles includes, as shown in FIG. 1,
- an opening 3b designed to be placed near a wall 2;
- a base 3a including a window 3 capable of allowing passage of a laser beam 6;
- a convergent intermediate part 5a between the opening 3b and the base 3a;
- a suction outlet 5 located in the intermediate part 5a of the hood, designed to suck away fine particles.

The hood 1 is advantageously, but without limitation, used in a device for laser ablation of a superficial layer of the wall as shown in FIG. 1.

Illustrated in FIG. 2 is a detailed view of the base 3a of the hood 1 for sucking away fine particles.

The base 3a includes at least one air inlet 110, such that in operation, and when suction is performed through the suction outlet 5, an air current is created at the base 3a, the air current running from the inlet 110 toward the outlet 5. This air current provides maximum prevention against the deposition of fine particles onto the window 3, as the fine particles resulting from the ablation are washed away by the air current.

The hood 1 preferably includes several air inlets 110 which are arranged around the entire perimeter of the base 3a of the hood 1, in order to further improve the effectiveness of the hood and to ensure that as many particles as possible leave the hood by the suction outlet 5.

These air inlets 110 are for example longitudinal and/or circular openings 11a, 11b, and 11c, of small size or small diameter (on the order of 2 mm for example), so as to limit the entry of outside dust into the hood for example (see for example FIG. 2).

In order to clean the window 3 in the event that at least one particle has been deposited on the window anyway, or in order to create an air curtain capable of covering the entire window 3 to provide still more prevention of such a deposit, the hood 1 also includes a convergent nozzle located at the air inlets 110, on the inner perimeter of the base 3a. The convergent nozzle 12 extends from the intermediate part 5a toward the window 3, constituting an internal and peripheral air outlet 15 toward the window 3. The outlet 15 has for example a height on the order of 5 mm.

This convergent nozzle 12 can have an S-shaped section, (FIG. 3a), but other shapes are possible, as for example a wall set perpendicularly (FIG. 3b) or obliquely to the window 3.

The arrangement of the convergent nozzle 12 at the air inlets 110 is shown in FIGS. 3a and 3b.

The convergent nozzle 12 constitutes, with the inlets 110, and upstream of the outlet 15, a settling chamber 120 where the air speed is low. Due to the convergent nozzle 12, the air enters through openings 11a, 11b, 11c, which can be numerous in order to maximize the entering air, and the air flow is equalized in the settling chamber 120.

Figure 5:
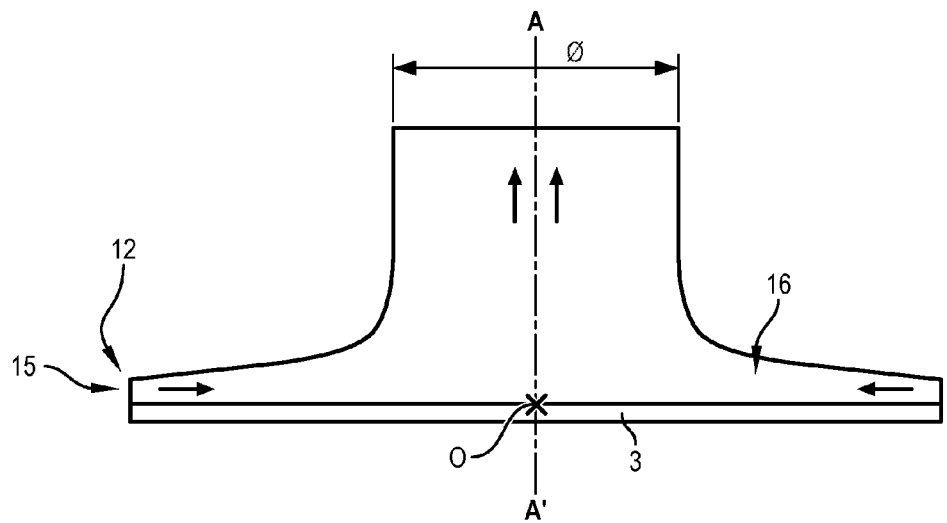
FIG. 5 illustrates an air flow profile in the hood according to the invention.

Due to suction at the outlet 5, the air flow, once equalized, is accelerated at the outlet 15 between the window 3 and the convergent nozzle 12 to constitute, due to a centripetal air flow, an air curtain 16 thus covering the entire window 3 (as shown in FIG. 5).

Considering the arrangement of the convergent nozzle and the outlet 15, the air flow is tangent to the window 3 at the peripheral outlet 15, and normal to the window 3 at its center O. The air flow at the window 3 is thus quasi-axisymmetric, as shown in FIG. 5.

This air flow profile allows any particle entering the hood 1 to be expelled through the opening 3b, by driving it toward the suction outlet 5.

In fact, any fine particle falling into the centripetal tangential air flow of FIG. 5 does not have the time to be deposited on the window 3, and it is forced to enter the flow normal to the window 3, whose stream is discharged at the outlet 5.

Any particle located in the normal flow is repelled by the flow.

In order to specify a few orders of magnitude, the outlet 15 can be assigned a thickness of 5 mm, in a square 150 mm on a side.

If the air speed within the outlet section 15 is 4 m/s, the air flow running into the outlet is 12 L/s.

The diameter $\Phi$ of the normal flow is about 62 mm.

The mean residence time of the air in the centripetal tangential air flow is 0.01125 seconds. Such a centripetal flow prevents the deposition of a particle whose sink rate 0.4 m/s, which corresponds to spherical particles with a density of 2000 kg/m$^3$ and a diameter of 80 micrometers.

Figure 4A:
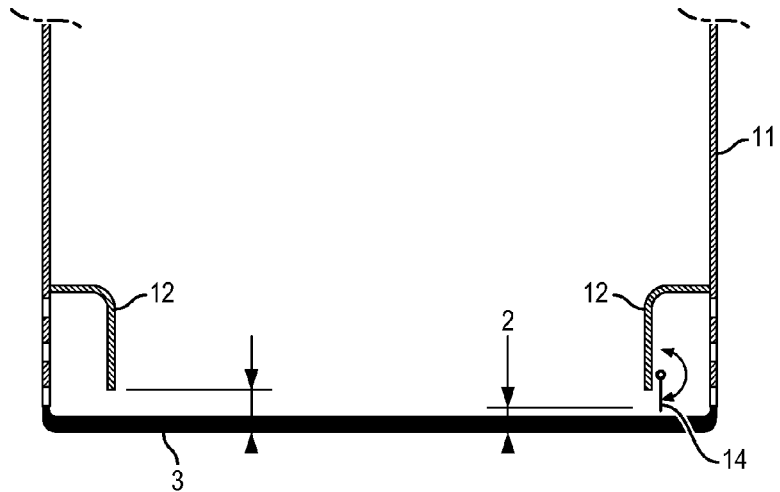
FIGS. 4a and 4b illustrate the placement of a movable flap in the hood according to the invention.
Figure 4B:
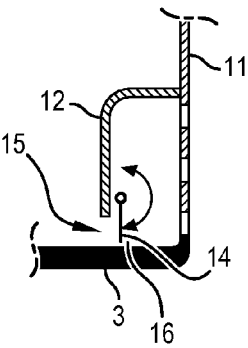

It should be noted that in order to deal with a point O in the flow (located on the axis AA' of the hood 1 as seen in FIGS. 2 and 5), a point O where the speed of the air flow is zero (it is therefore not possible to clean off a particle placed at that point on the window), a flap 14, movable between an open position and a closed position, is located near part of the air inlets 110 of the hood 1 (see FIGS. 4a and 4b).

More precisely, the flap 14 is arranged so as to block or at least partially restrict the air inlets 11a, 11b, 11c, through the outlet 15, intermittently for example, to destroy, at least temporarily, the axisymmetrical nature of the flow. Thus, the flow no longer has zero speed at the point O. Thus, in the case where a particle would approach this point O it would be repelled toward the outlet 5 of the hood 1.

The opening and closing of the flap 14 could occur by means of a small motor.

Advantageously, the flap 14 is not totally airtight, so as to maintain a flow at its location and to avoid deposition of particles on the window 3. Thus, a clearance 16 of a few millimeters is left, 2 mm for example, even when the flap is in the closed position.

Consequently, besides the fact that the particles are repelled far from the window 3, it is possible to intermittently clean the window 3 at point O.

This ensures not having any particles on the window without having an additional device which would have to be placed along the path of the laser beam.

The invention claimed is:

1. A suction hood for fine particles, comprising:
   an opening designed to be set near a wall;
   a base including a window capable of allowing passage of a laser beam;
   an intermediate part between the opening and the base;
   a suction outlet located on the intermediate part of the hood designed to suck away the fine particles;
   a plurality of air inlets located at the base, capable of creating, in operation, an air current having an axisymmetrical flow at the base of the hood preventing the deposition of fine particles on the window; the hood is characterized in that it includes a movable flap designed to block or at least partially restrict certain air inlets to destroy, at least temporarily, the axisymmetrical nature of the flow to intermittently clean the window at its center.

2. A hood according to claim 1, further comprising a convergent nozzle, located at the air inlet capable of making the air enter the hood tangent to the window then make it flow within the hood from the window toward the opening in a direction perpendicular to the window.

3. A hood according to claim 2, in which the convergent nozzle includes a wall with an S shaped section.

4. A hood according to claim 1, wherein the plurality of air inlets are located on a perimeter of the base of the hood.

5. A hood according to claim 1, in which the air inlets are longitudinal and/or circular openings.

6. A hood according to claim 1, wherein the intermediate part between the opening and the base is convergent.

7. A device for laser ablation of a superficial layer of a wall including at least one ablation laser source, wherein the device includes a hood for sucking away fine particles according to claim 1.

* * * * *